L. E. WATERMAN.
POTATO PLANTER.
APPLICATION FILED JAN. 12, 1917.
1,305,423.
Patented June 3, 1919.
7 SHEETS—SHEET 1.
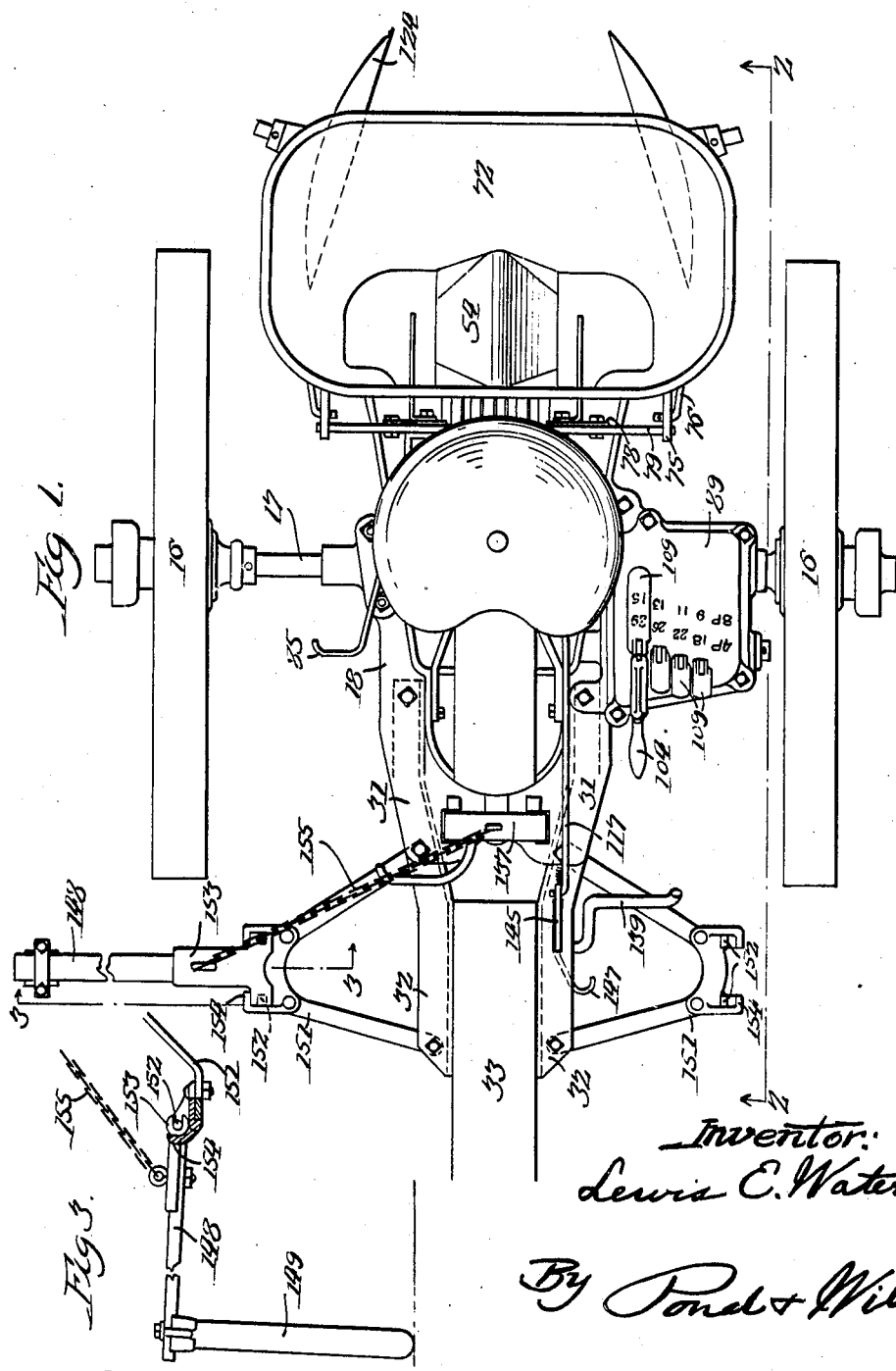

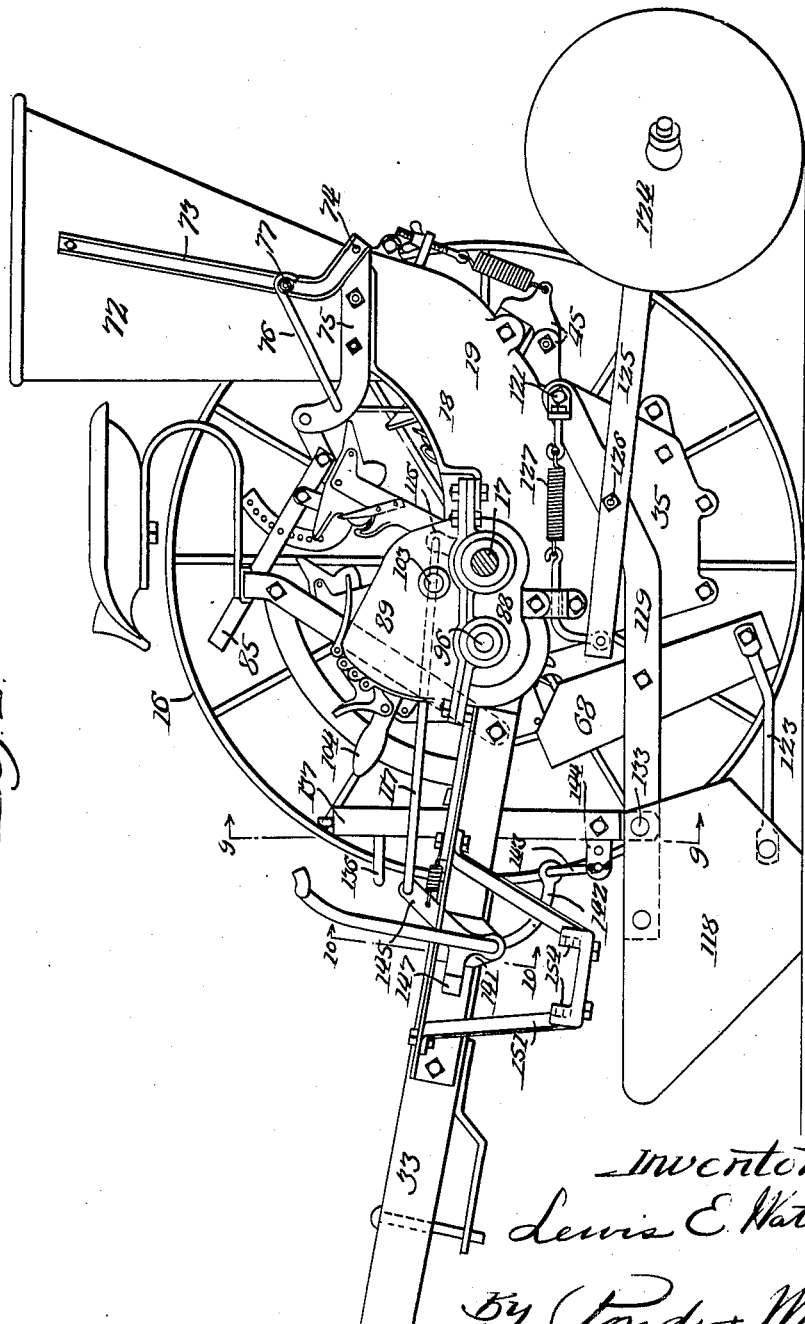

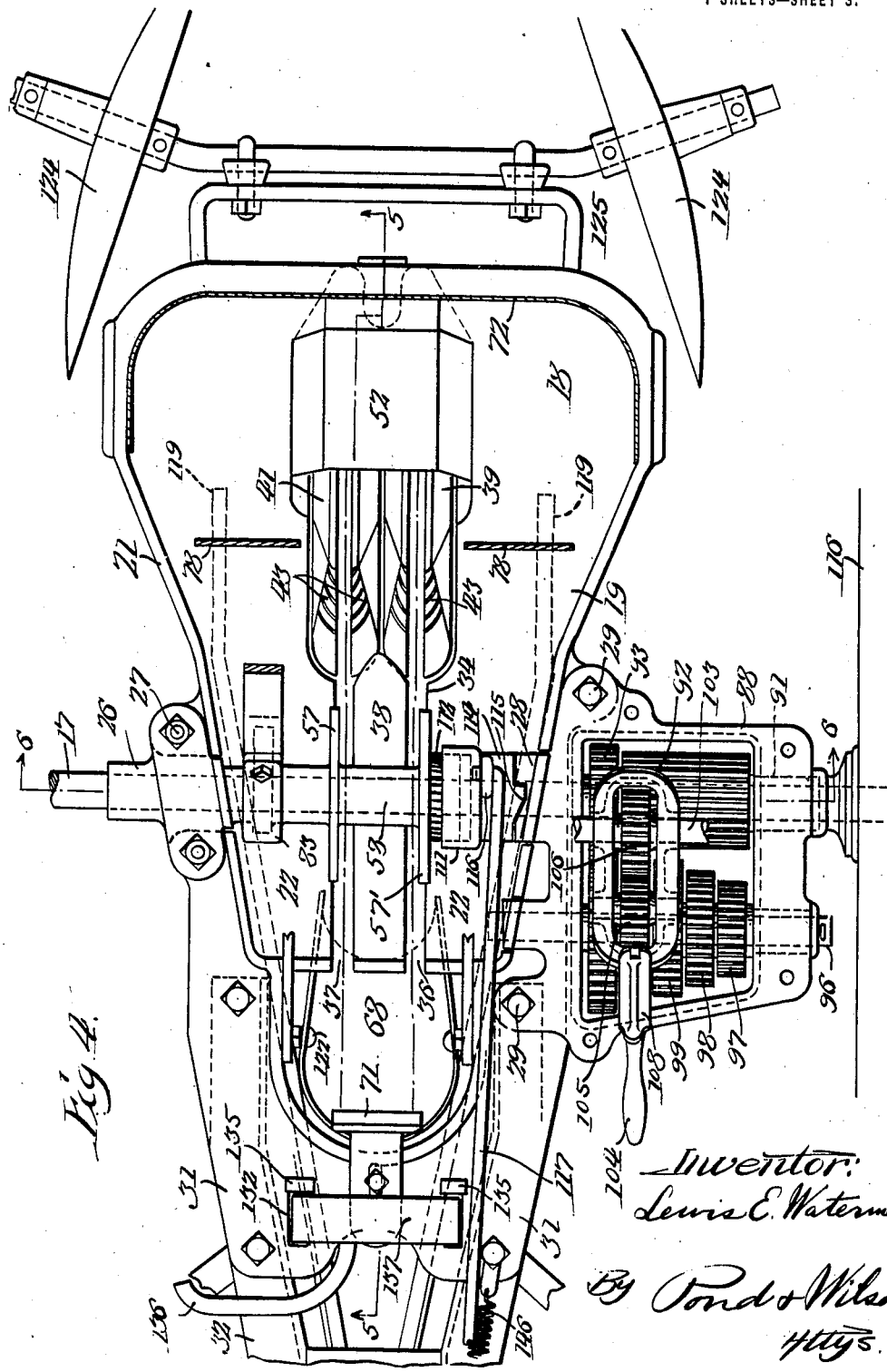

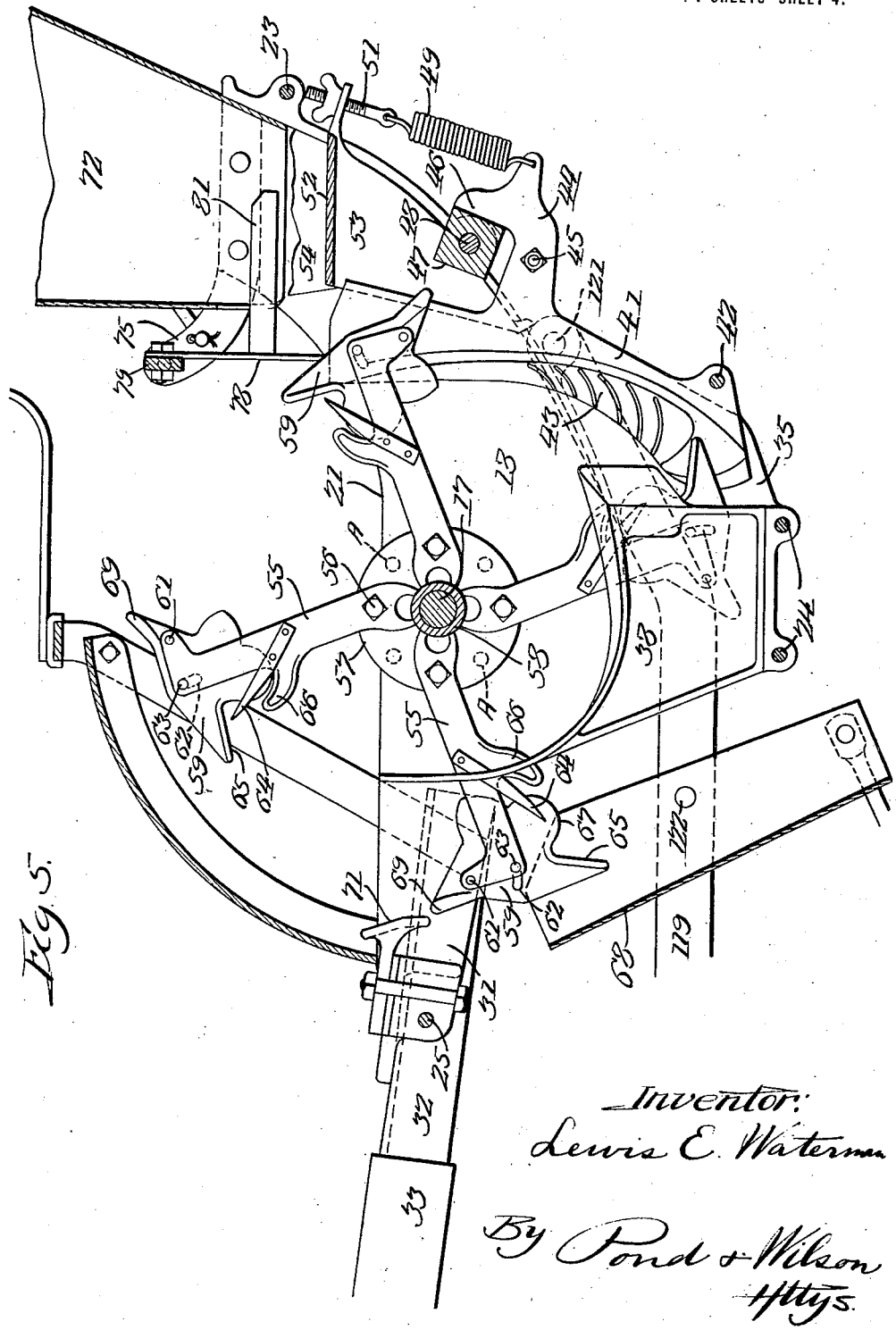

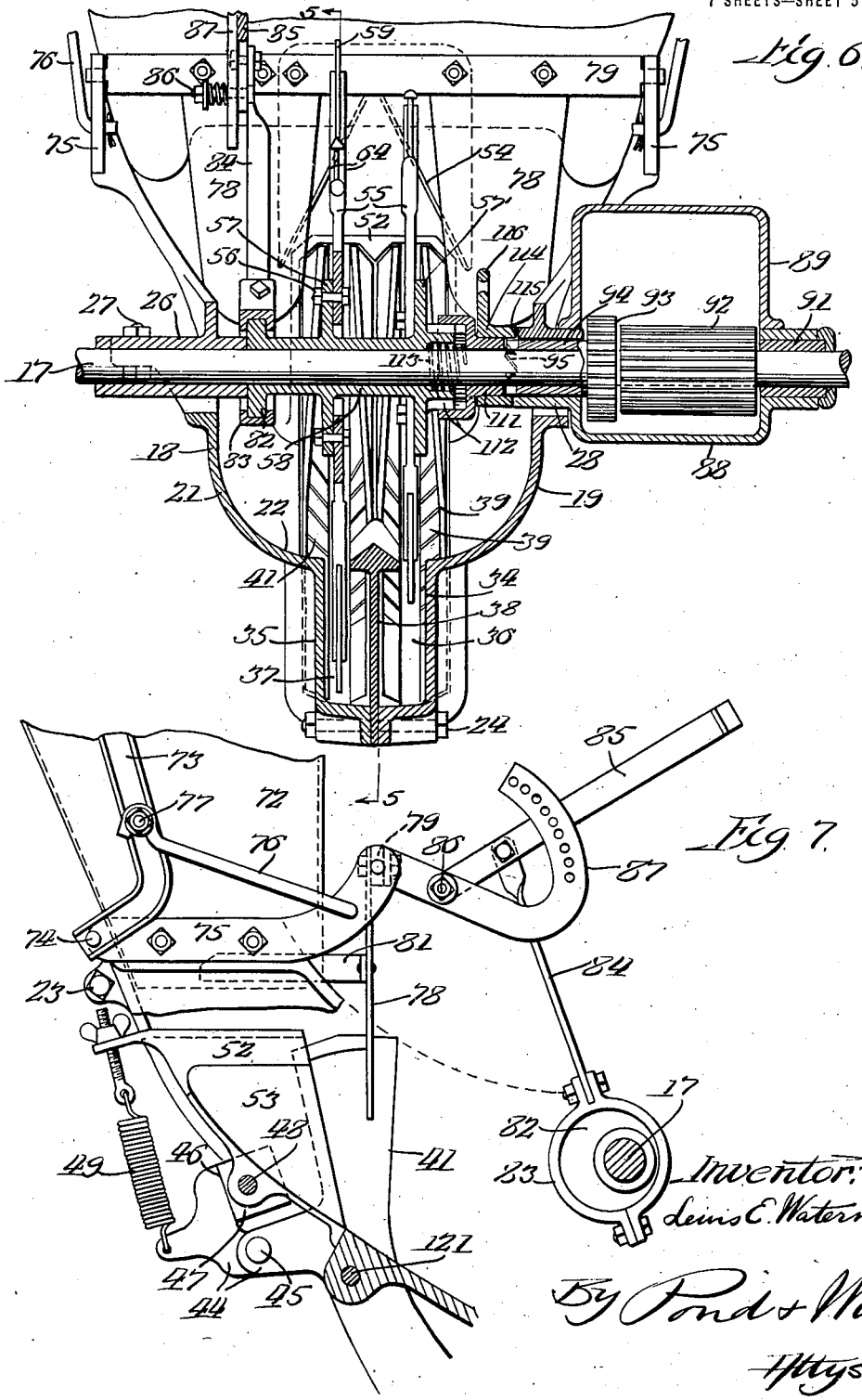

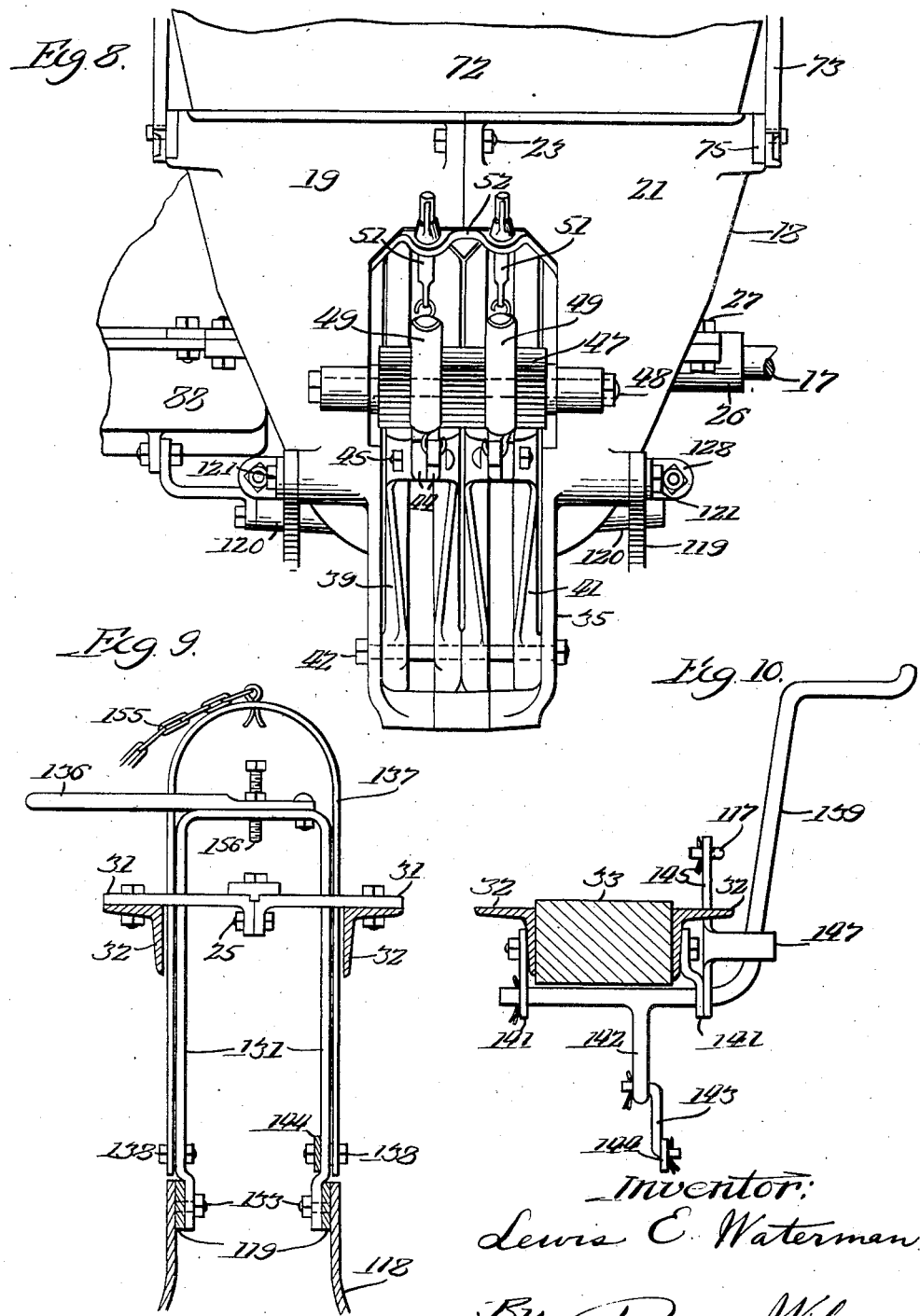

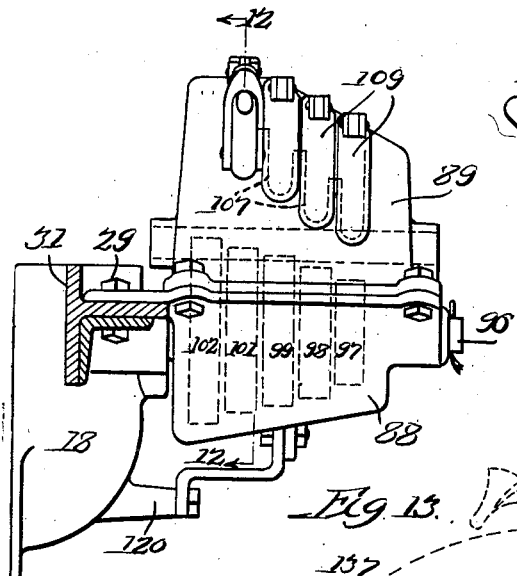
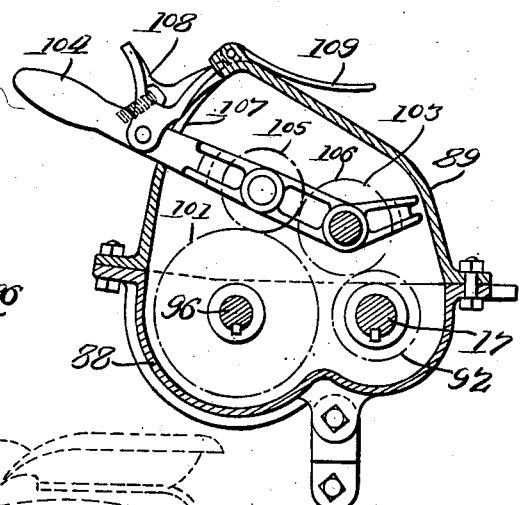
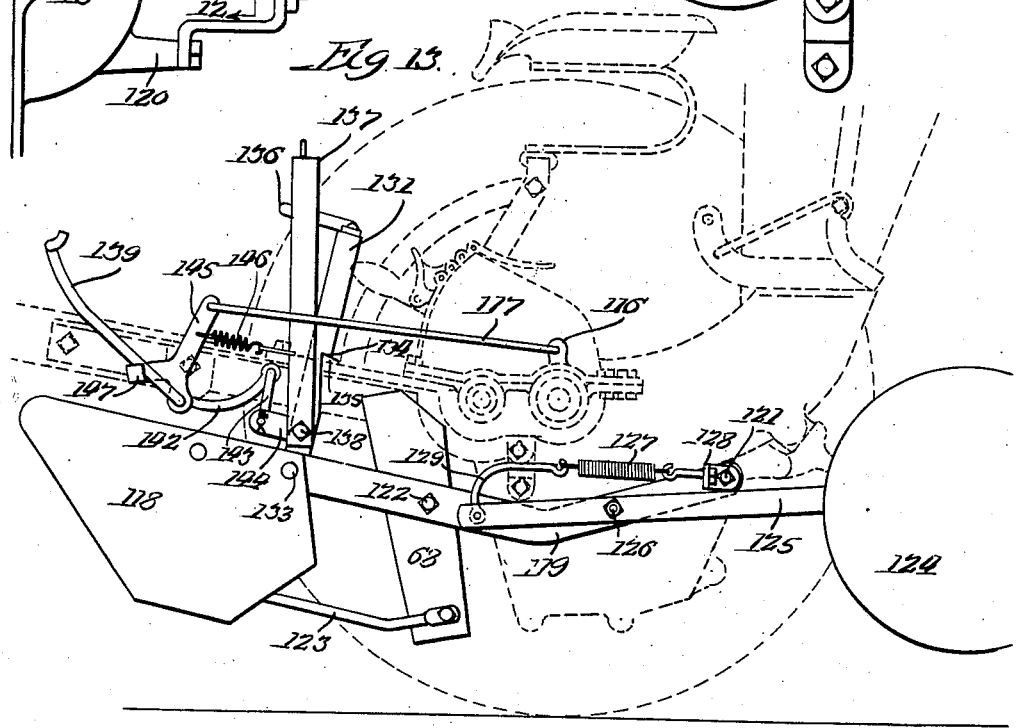

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POTATO-PLANTER.

1,305,423.  Specification of Letters Patent.  Patented June 3, 1919.

Application filed January 12, 1917. Serial No. 142,013.

*To all whom it may concern:*

Be it known that I, LEWIS E. WATERMAN, a citizen of the United States, residing at Rockford, in the county of Winnebago and State of Illinois, have invented certain new and useful Improvements in Potato-Planters, of which the following is a specification.

This invention relates to the general art of seeders and planters, and has more particular reference to potato planters, especially those equipped with automatic potato dropping mechanism driven from one or more of the ground wheels.

The primary object of my invention is to provide a potato planter of generally improved construction containing novel features enabling planting in a most practical manner and allowing a convenient and desirable one-man control of the various operating parts. And in these general improvements I have aimed to provide a most durable structure thoroughly capable of withstanding severest usage and one which is fully adapted for all the requirements of potato planting. At the same time, I have designed the parts so that as a whole the planter will have a symmetrical appearance and is capable of being produced at a comparatively low cost, considering its many features and merits.

One of the objects of my invention resides in the provision of an improved hopper mounted so that it may be swung backwardly to dump seed potatoes therefrom and for allowing access to the pickers and base of the potato magazine for the purpose of cleaning the same and for repairing or other purposes.

Another object is to provide improved means for governing the passage of seed potatoes downwardly through the troughs of the potato magazine so that the supply of seed potatoes to the pickers will be in accordance with the speed of planting. In accomplishing this object I have provided a plurality of adjustable gates arranged to restrict said passages through the troughs to greater or less extent and my invention also contemplates the use of these gates as agitators, the gates being oscillated while the planter is in operation to keep the seed potatoes in motion and to prevent bridging of the potatoes in the magazine.

Still another object is to provide a potato magazine constituting the main frame of the machine and constructed to facilitate the passage of seed potatoes to the pickers and comprising but few parts so as to give a very substantial frame capable of being manufactured at a comparatively low cost.

Other objects and many of the inherent advantages of my invention will be readily appreciated by those skilled in the art as the same becomes better understood by reference to the following description when considered in connection with the accompanying drawings, wherein—

Figure 1 is a plan view of a potato planter embodying my improvements;

Fig. 2 is a side elevation of the planter taken on section line 2—2 of Fig. 1, showing the furrow opening plow and covering disks on the ground level;

Fig. 3 is a detail sectional view taken on the line 3—3 of Fig. 1, illustrating the marker;

Fig. 4 is an enlarged plan view looking into the potato magazine, the hopper and cover of the drive transmission being removed and some of the parts being broken away;

Figs. 5 and 6 are vertical sectional views taken substantially on the line 5—5 and 6—6, respectively, of Fig. 4;

Fig. 7 is a fragmentary side elevational view looking at the rear portion of the right side of the planter;

Fig. 8 is a fragmentary rear view of the planter;

Figs. 9 and 10 are vertical sectional views taken substantially on the line 9—9 and 10—10 of Fig. 2;

Fig. 11 is a front elevation of the change speed transmission;

Fig. 12 is a vertical section through the transmission taken substantially on the line 12—12 of Fig. 11; and Fig. 13 is a somewhat diagrammatic view showing the furrow-opening plow and covering disks locked in raised position, the parts moved by the operation of raising the furrow-opening plow and covering disks being shown in full lines.

Supporting and drive wheels 16 carry a through axle 17 and have the usual ratchet driving connection therewith, not shown in detail as this construction is well known in the art. Mounted upon the axle is the main frame designated generally by reference character 18, which also forms the potato magazine from which the seed potatoes are removed by the pickers. Referring to Figs. 4 to 8 inclusive, which best show the construction of this frame, it will be observed that it is formed in two half sections designated generally by characters 19 and 21. These are shaped to provide forward and bottom walls 22 substantially concentric with the center of the axle 17, which together with the side walls of these frame sections extend rearwardly and upwardly forming an open-top funnel-shaped magazine, as is clearly shown in the drawings. The frame sections are secured together at the rear end primarily by means of bolt 23, at their underside by bolts 24, and at their forward ends by a bolt 25. While the frame is in reality mounted on the axle 17, independent bearings bolted to the frame form the direct means of attachment to the axle. This connection is established at one side of the frame by a bearing bracket 26 connected thereto by bolts 27 and at the other side of the frame by bearing 28 formed integral with a gear casing described more particularly hereinafter and secured to the frame by means of bolts 29. The frame sections are also shaped to provide forward integral extensions 31 which on their inner sides define the opening to the down spout mentioned hereinafter and have bolted to their outersides hounds 32 interposed between and bolted to which is a tongue 33. Viewing Fig. 4, it will be noted that there is an opening 34 of considerable width between the inner edges of the frame sections extending longitudinally throughout the length of the frame and being somewhat enlarged at the rear portion thereof. This opening is defined at its forward end by the downward integral extensions 35 of the frame sections and is divided at its forward portion into two openings 36 and 37 by a division wall 38 shaped on its upper side to conform to the adjacent bottom and forward walls of the frame sections and being interposed between the same and securely held in position by the bolts 24. In the rear portion of the opening 34 are located a pair of presser boots or concaves designated generally by characters 39 and 41 with which the picker arms coöperate as will be presently apparent. These concaves, of peculiar shape as shown in Fig. 5, are each composed of half-sections spaced apart so as to form longitudinal openings in alinement with the openings 36 and 37 and are pivotally mounted at their lower ends on the frame sections at 42. Each concave is shaped to provide inner and forward faces 43 flanking the openings 36 and 37, converging upwardly and curving forwardly in a path eccentric with respect to the center of the axle 17. These faces may be ribbed as indicated in the drawings, and between them the potatoes lodge and are gathered by the picker arms. The sections of each concave are formed with rearward extensions 44 rigidly secured together by bolts 45 so that each concave is substantially an integral part independently movable about the pivot 42. The concaves are maintained in a normal position, as shown in Fig. 5, and may be swung backwardly against a spring tension. One of the extensions 44 of each concave is shaped to provide an upstanding abutment 46 which engages a stop preferably in the form of a wood block 47 mounted upon a bolt 48 in turn secured to the main frame sections. A contractile spring 49 connects each extension 46 to an adjusting screw 51 connected to a part fixed to the frame and serves to hold the concaves yieldingly in their normal positions. By adjusting the screws 51 the tension of the springs 49 and consequently their effect on the concave 41 may be varied. A hood 52 covers the rear end of the opening in which the concaves are located and is shaped to provide side walls 53 tapered inwardly at their upper edges, which together with the top wall of the hood form a housing to prevent seed potatoes from entering behind the concaves. A V-shaped deflector and division plate 54 directly overlying the hood 52 serves to divide the seed potatoes gravitating from the hopper into two channels leading downwardly into the opposite sides or troughs of the magazine.

The potato-dropping device is of the revolving picker-arm type and consists, generally stated, of two sets of a plurality of pickers mounted on a collar revoluble about the axle 17 and movable through the openings 36 and 37, each picker arm being adapted, when revolved, to move upwardly between the faces 43 of its respective concave so as to impale a potato lodged between such faces and carry it forwardly to a position over the down spout, at which point it is released from the picker arm and drops through said down spout into the furrow. Each set of pickers consists of four picker arms 55 extending substantially radially from and rigidly secured by means of bolts 56 to a radial flange 57 formed integral with a collar 58 revolubly mounted on the axle 17. The outer end of each picker arm is bifurcated to receive a stripper plate 59 which is pivotally mounted at 61 upon the picker arm and is formed with an arcuate slot 62 through which passes a pin 63 carried by the picker arm for limiting the swinging movement of the stripper plate. A pair of prongs 64 secured to the picker arm on opposite sides of the stripper plate are adapted to impale a seed potato disposed between the abutment portion 65 of the stripper plate and the rigid finger 66 of the picker arm. There are four equally spaced picker arms in each set arranged in alternating relation so that collectively they are equally spaced apart. As the collar 58 is revolved by a drive mechanism fully described hereinafter the stripping plate of a descending picker arm will swing downwardly as shown at the left of Fig. 5, thereby positioning its abutment 65 farthest from the prongs 64 and projecting its stripping portion 67 beyond the points of the prongs 64. As this picker arm is moved forwardly and upwardly between the faces 43 of its respective concave (it being understood that the lower portion of the magazine is filled with seed potatoes), a seed potato located at the base of the concave will be engaged by the picker arm, the raising action of which in conjunction with the peculiar shape of the concave will cause the stripper plate to be swung in a clockwise direction, viewing Fig. 5, and the seed potato to be impaled on the prongs 64 and held thereon between the abutment 65 of the stripper plate and the finger 66 of the picker arm. The finger 66, however, is of service only when a large seed potato is impaled. The seed is carried forwardly by the revolving picker arm and when located above and in close proximity to the upper end of the inclined down spout 68, the end 69 of the stripper plate will be actuated by a tripper 71, which rocks the stripper plate causing the portion 67 thereof to be moved forwardly and thereby strip the seed from the prongs 64. Thus as the picker arms are revolved seed will be automatically gathered thereby and single seeds will be dropped into the down spout at regularly spaced intervals, and since the picker arms are driven from and in timed relation with the ground wheels, in a manner described hereinafter, a predetermined number of seed will be dropped at equally spaced intervals during each revolution of the wheels.

A hopper 72 arranged to discharge into the top of the potato magazine is pivotally mounted upon the rear end thereof so as to be capable of swinging backwardly to an inoperative position, both for the purpose of quickly dumping seed potatoes from the hopper when desired and for allowing access to the potato magazine. It will be noted that the hopper is open at both ends and fits into the top of the potato magazine, extending but a short distance thereinto, as shown in Fig. 5. Reinforcing bars 73 secured to each side of the hopper are pivotally mounted on the rear ends 74 of side bars 75 bolted to the sides of the magazine, the ends 74 being located at the rear and lower end of the hopper so that the same will be free to swing backwardly on said ends or pivots without interfering with the magazine. Keepers 76 pivoted on the side bars 75 are provided with hooked ends for engagement with bolts 77 on the bars 73 for the purpose of rigidly securing the hopper in upright position and upon releasing the keepers it will be obvious that the hopper may be swung backwardly as desired.

Agitating means is provided for stirring the potatoes as they move downwardly through the troughs in the magazine at each side of the dividing plate 54 for the purpose of preventing bridging of the potatoes. The agitators are also shaped to provide gates for limiting the downward passage through the troughs in the magazine to prevent the seed potatoes from piling up in the magazine. Referring especially to Figs. 6 and 7, there are two gates 78, rigidly secured to a cross-bar 79 pivotally mounted at its ends on the forward ends of the side bars 75, the gates being arranged so as to project downwardly across the troughs in the magazine forwardly and at each side of the dividing plate 54, to restrict the downward passage of seed potatoes as will be evident from an inspection of these figures. An agitator blade 81 is secured to the rear side of each gate 78 and projects rearwardly therefrom into the potato seed passage. By oscillating the transverse bar 79 in short slow movements, the seed potatoes are sufficiently stirred in their downward passage through the magazine and yet restricted by the gates 78 so as to give a free and yet unobstructed passage. The gates 78 are positively controlled in a manner to allow the seed potatoes to pass to the bottom of the magazine at a rate commensurate with the speed of the picker arms so that the bottom of the hopper will not be choked with the seed potatoes. For this purpose an eccentric 82, which may be integral with the picker arm sleeve 58, is adapted to oscillate the transverse bar 79 when the picker arms are in operation. Connection between these parts is established by means of a collar 83 on the eccentric having a link connection 84 with an adjusting lever 85 pivotally mounted on a spring bolt 86 on a segment 87 fixedly secured to the bar 79, the lever 85 being interlockable with the segment 87 at spaced points thereon. Thus adjustable connection is established between the eccentric 82 and gates 78 whereby the gates may be oscillated in movements restricting the trough passage to greater or less extent, according to the adjustment of the lever 85. It will be here noted that this adjustment of the range of movement of the gates 78 has been provided so that the supply of seed potatoes to the picker means will be in accordance with the speed at which the seed potatoes are gathered thereby, and the adjustment shown in Fig. 7 may be said to allow a medium size passage. When the lever 85 is engaged in the top notch of the segment the trough passages will be most restricted, and the converse is true when the lever is engaged in the lowermost notch.

Coming now to the means for driving the pickers and for governing the speed thereof, reference may be had particularly to Figs. 4, 6, 11 and 12 which best show the construction. Generally stated, this consists of a driving means between the ground wheels and the pickers including a clutch whereby the driving may be disconnected and including also a change speed transmission, whereby the pickers may be driven at any of a plurality of different speeds by simply adjusting a single lever. The transmission is contained in a housing formed in two parts, namely a base 88 and a cover 89, the former of which is rigidly secured to the frame by bolts 29 mentioned above and has formed integral therewith the bearing 28 also previously mentioned. The cover 89 is suitably bolted to the base 88. The axle 17 extending through the transmission casing, has a bearing 91 in the outer side of the base thereof and has fixedly mounted thereon within the casing a relatively long spur gear 92 and loosely mounted thereon a spur gear 93 having integrally formed therewith a sleeve 94 journaled in and extending through the bearing 28 and having a toothed end 95 constituting one member of a clutch. An intermediate shaft 96 journaled in the base 88 has fixedly mounted thereon a series of graduated or differently sized spur gears 97, 98, 99 and 101 and also a fixed gear 102 in mesh with the gear 93. A shaft 103 mounted on the cover 89 forms the support and fulcrum for a gear shifter. This shifter is in the form of a lever 104 mounted so as to pivot and slide lengthwise on the shaft 103 and shaped to support and carry therewith a loose spur gear 105 in mesh with a gear 106 loose on the shaft 103 and permanently in mesh with the gear 92. By shifting the lever 104 lengthwise on the shaft 103 the gears 105 and 106 will be shifted lengthwise and the lever may be positioned to engage its gear 105 in mesh with any one of the gears 97, 98, 99 or 101. Means are provided for guiding the lever 104 so that when shifting the same it may be properly engaged in whichever gear is selected and also be locked in such engagement. To accomplish this the cover 89 is formed with an opening through its front wall shaped to provide an inclined opening from which extend vertical slotways 107 in transverse alinement with the gears 97 to 101 inclusive and stepped to correspond with their different sizes, as clearly shown in Fig. 11. The lever 104, when at one of its engaged positions, as shown in Fig. 12, rests on the bottom of the slotway 107 opposite the engaged gear, and to lock the lever in this position a spring thumb latch 108 is pivoted on the lever and adapted to engage the upper wall of the opening so as to prevent upward movement of the lever. The latch also fully covers the opening in which the lever is located so as to prevent dust or dirt from entering the casing. Individual pivoted caps 109 are also provided for this purpose, one cap being provided for each slotway 107, and in order to shift the lever the caps must be drawn back on their hinges as will be obvious. The complement to the clutch member 94 is a sleeve member 111 having an internal tooth engagement 112 with the picker arm sleeve 58 of such form that the clutch member 111 may be moved longitudinally on the axle 17 and be in constant driving connection with the picker arm sleeve. An expansion spring 113 on the axle constantly urges the clutch member 111 in a direction to engage the member 94. A collar 114 fitting loosely on the reduced portion of the clutch member 111 is provided with diametrically opposed teeth 115 adapted to enter correspondingly shaped notches in the bearing 28 and is provided also with an upstanding arm 116 to which an operating rod 117 is connected. When this rod is moved forwardly the collar 114 will be oscillated and moved lengthwise of the shaft by the cam action of its teeth 115, thereby disengaging the clutch member 111 against the pressure of the spring 113, and conversely when the rod 117 is moved rearwardly, the collar 114 will permit the clutch to be engaged under the influence of the spring. From the foregoing it will be manifest that when the planter is drawn forwardly, the clutch being engaged, the axle 17 will be revolved by the carrying wheels through their ratchet connections, and the picker arms will be driven through the intermediary of gears 92, 105, 106, 101, 102, 93 and the clutch connection. Since the gear 101 is the largest of the series of four gears independently engageable in this driving connection, the picker arms will be driven at their slowest speed and by shifting the lever 104 to engage any one of the other gears in the series a faster driving speed of the picker arms may be obtained according to the gears selected, the smallest gear giving the fastest drive. Thus the driving connection between the carrying wheels and said potato picking and dropping device is of a permanent nature and includes a shifting device whereby the speed of planting may be very quickly changed to suit requirements. And since the seed potato dropping device is arranged to drop seed potatoes at regularly spaced intervals a different number of seed potatoes will be dropped at each different driving speed with respect to each revolution of the ground wheel. In order that the operator may know the effect of these different speeds, that is, at what distance apart the seed potatoes will be planted, indicia is placed permanently on the top of the transmission cover to which he may refer when selecting any driving speed. Referring now to Fig. 1, it will be noted that the cover 89 contains two rows of figures parallel with the slotways 107, certain figures of which are in longitudinal alinement therewith. The rear row contains "8P, 9, 11, 13 and 15" and the forward row contains "4P, 18, 22, 26 and 29", the numerals 9 and 18 in their respective rows being in alinement with the small gear 97 and so on, the remaining numerals are located in alinement with the other three gears of the series mentioned above. The markings "4P" and "8P" refer to the number of picker arms in use. When 8 picker arms are in use and the shifting lever 104 is in the position shown in full lines a seed potato will be planted each 15 inches apart as indicated by the numeral 15 in the "8P" column opposite the shifting lever. If the shifting lever now be moved to engage the gear 97, the planting would be at 9 inches apart. If it is desired to plant at distances greater than 15 inches apart four of the picker arms will be removed. In order that the four picker arms left in use be mounted two in each set and arranged relatively in alternate relation, it will be necessary to remove two diametrically opposite picker arms from one set, remove all the picker arms from the other set, and then remount two from this last set in special holes for the purpose so that these picker arms will be located 45 degrees apart relatively to the picker arms of the other set. In other words, referring to Fig. 5, since the picker arms of the set not shown would be attached to the plate 57' at points corresponding to the dotted holes A, upon any two picker arms of this set being removed the remaining picker arms would not be spaced 45 degrees apart with respect to the two picker arms left mounted on the plate 57. Hence the plate opposite the plate 57 would be provided with either 6 or 8 holes, 2 or 4, as the case may be, of which are in alinement with the holes in the plate 57 so that two picker arms might be remounted on the plate 57' and be spaced quarteringly with respect to the two picker arms on the plate 57. With 4 equally spaced picker arms in use and arranged so that they plant alternately from each set, and with the lever 104 in the position shown in full lines the planting will be at 29 inches apart as the indicia indicates. It will be understood that while I have taken a particular example, this is merely for purpose of illustration, and although the figures referred to serve very practically the ordinary needs in potato planting, the relative speeds and ratios may be changed, within the scope of the invention.

As mentioned above, my invention contemplates the adjustment of gates 78 to restrict the downward passage of the seed potatoes through the magazine in accordance with the speed of the dropping device. Consequently when the planter is arranged for planting seed potatoes 9 inches apart, the lever 85 will be set so that the gates 78 will operate to allow their fullest opening in the trough passage, and when the planting is at 29 inches apart, the lever 85 will be adjusted so that the passage of potatoes into the magazine will be most restricted.

The furrow forming and covering means and the control therefor will now be described, reference being had particularly to Figs. 2, 4, 9, 10 and 13. The furrow-opening plow 118 located forwardly of the down spout 68 mentioned above is rigidly secured to the forward end of a frame formed by rearwardly diverging side bars 119 pivotally secured at their rear ends to the main frame by means of bolts 121. The down spout 68 interposed between the side bars is connected thereto by bolts 122 and is further held in position by a brace bar 123 connecting its forward end to the plow 118. The furrow-opening plow as thus mounted is capable of being swung vertically with respect to the main frame. A pair of disk covering shovels 124 may be suitably mounted on a frame 125 so as to be capable of proper adjustment with respect thereto, the frame being in the form of forwardly extending side bars pivotally mounted intermediate their ends at 126 on the side bars 119 and extending forwardly beneath laterally projecting lugs 120 on the main frame. The covering shovel frame is under the constant influence of contractile springs 127 arranged to urge the disks into the ground. As shown in Figs. 2 and 13, these springs are adjustably connected at one end to a fixed plate 128, held by the bolts 121 and at their opposite ends by links 129 passing over the lugs 120 and pivotally connected to the forward ends of the bars 125. When the plow and covering shovels are in the ground (in which position they are not shown in the drawings) the forward ends of the bars 125 will be slightly spaced below the lugs 120 so that the covering shovels are free to move vertically, being held in lowered position under the influence of the springs 127. When the plow 118 is raised the forward ends of the bars 125 will abut against the undersides of the lugs 120, thereby causing as the plow is continued to be raised the shovels to be swung upwardly on the pivots 126 so as to be raised completely from the ground to the elevated position shown in Fig. 13. Foot-operated means is employed for accomplishing this raising movement and provided for automatically locking the plow and covering shovels in raised position upon being elevated thereto and for simultaneously disengaging the clutch in the driving connection to the picker arms. An upright bail 131, the arms of which pass through openings 132 in the forward extensions 31 of the main frame, is pivotally connected at its lower ends by bolts 133 to the plow 118. The arms of the bail on their rear sides are each formed with a notch 134 (Fig. 13) so that when the plow is raised these notches may be engaged by fixed abutments 135 on the main frame to lock the plow in raised position. A foot stirrup 136 secured to the upper end of the bail 131 affords a means by which the bail may be easily moved forwardly and disengaged from the abutments 135. A second bail 137 disposed on the outer side of the bail 131 is pivotally mounted thereon at 138, and passes through the openings 132, and serves a purpose apparent hereinafter. A foot lever 139 pivotally mounted in brackets 141 bolted to the hounds 32 is provided with a rearwardly and downwardly extending arm 142 pivotally connected by means of a short link 143 to the forward end of a short projecting arm 144 fixedly secured to the bail 131. The arrangement is such as to cause a rearward thrust on the bail 131 when the lever 139 is swung forwardly to raise the plow, and this bail being thrust rearwardly into engagement with the abutments 135 will be locked in connection therewith when the notches 134 reach said abutments, as will be obvious. A lever 145 pivotally mounted on the horizontal pivot portion of the lever 139 is pivotally connected at its upper end to the forward end of the clutch shifting rod 117 and a contractile spring 146 connecting said lever 145 to a part of the frame tends to urge this lever in the direction to engage the clutch. The lever 145 is provided with a forwardly projecting arm 147 located in the path of the lever 139 as shown in Figs. 1 and 10, so that when the lever 139 is swung forwardly to raise the plow and covering disks the lever 145 will be actuated to disengage the clutch.

A marking attachment is also provided by which to mark the ground for guidance in planting the next row. This attachment is best shown in Figs. 1, 2 and 3. It consists of a marking-bar 148 equipped at its outer end with a marker 149 and being suitably mounted so that it may be raised and lowered from operative position and moved to either side of the planter for marking on both sides thereof. A suitable mounting for the marker consists of supports 151 mounted upon and projecting laterally from the hounds 32 and equipped at their outer ends with opposed pintles 152 with which the slotted bracket 153 attached to the marker bar is adapted to pivotally engage. The slotted head of the bracket 153 is entered upon the pintles by placing the marker bar in an upright position so that the pintles may enter the slots from beneath, whereupon the marker is swung outwardly to the horizontal position shown in Fig. 3, the ears 154 of the supports 151 engaging behind the lateral extensions of the bracket 153 so as to hold the marker in position. The marker is connected by means of a chain 155 or any flexible connection to the top of the bail 137. When the furrow-opening plow and covering disks are raised in the manner described above, it will be evident that the bail 137 in being raised will raise the marker from the ground through the medium of the chain connection 155, it being desirable to secure the marker connection to a bail or part separate from the bail 131 because a forward pull on the latter would have a tendency to prevent it from being properly engaged with the abutments 135.

The operation of my improvements is as follows: In the normal inoperative position of the planter the furrow-opening plow 118 and the covering disks 124 are held in an elevated position by reason of the foot lever 139 having been pushed forward until the bail 131 has been locked on the frame abutments 135. Such movement of the foot lever 139 also disengages the clutch between the change speed gear transmission and picker arms so that the latter stand stationary, and also raises the marker to an inoperative position. Before commencing to plant, the operative determines the distance between planting according to the condition of the ground, the seed potatoes, etc., and sets the lever 104 in the desired position. That is, if the seed potatoes are to be planted 15 inches apart the lever is set as shown in Fig. 1, using two sets of four picker arms each. Assuming that the hopper 72 is filled with seed potatoes the latter will pass down through the hopper and be divided by the plate 54 into two channels, respectively leading downwardly and forwardly into the magazine chamber, from which the seed potatoes are adapted to be removed by the picker arms. This magazine and the several parts therein is readily accessible for cleaning and repair purposes by swinging the hopper 72 backwardly to an inoperative position after the potatoes have been removed from the hopper. To commence the planting operation, the operative pushes the foot stirrup 136 forwardly, thereby releasing the bail 131 from its locked position. This will allow the furrow-opening plow, the covering disks and the marker to drop to operative position and will simultaneously engage the clutch which connects the picker arms with the drive wheels. As the planter travels forward, the picker arms will be revolved in a counter-clockwise direction viewing Fig. 5 at such speed as to plant the seed potatoes 15 inches apart.

During the planting operation, the potatoes passing from the hopper 72 to the picker chamber are constantly agitated by the oscillating gates 78 which prevent the potatoes from bridging and clogging. These gates also detremine the feed of the potatoes to the pickers and by shifting the lever 85 the feed may be increased or diminished in accordance with the rate of planting. Since the potatoes fill the bottom of the picker chamber, the picker arms will each impale a potato when moving upwardly past the concaves, as fully described above, and will respectively drop the potatoes into the down chute 68.

Having described separately the construction and operation of the several parts of my improved potato planter, it will be manifest that when the same is in operation and the end of a row is reached the driver may put all of the operating parts out of operation simply by the use of one foot to press the lever 139 forwardly. This raises the furrow-opening plow and covering disks and automatically locks them in elevated position, throws out the clutch so as to discontinue the drive of the seed potato dropping device and raises the marker from the ground. As a result of this simple control the driver has both hands free to guide the team in making the turn and consequently his attention need be in no way distracted from the guidance of the horses. When the planter has been turned and the planting is resumed the driver may put all of the working parts into operation again by simply pressing forwardly on the foot stirrup 136. This disengages the bail 131 from its locked position, allowing the plow and disks to assume their lowered position, the clutch to be engaged and the marker to fall back into marking position. It will be noted that the lowered working position is limited by abutment of the adjustable bolt 156 (Fig. 9) carried by the bail 131, against a fixed part of the frame, which in this instance, is the adjustable plate which carries the tripper 71.

While I have shown and described a preferred mechanical embodiment of my improvements it should be understood that the same are susceptible of considerable modification and change without departing from the spirit and scope of the invention as expressed in the appended claims.

I claim:

1. In a potato planter, the combination with an open-top potato magazine constructed to receive and accommodate a potato-conveying device, of an open-end hopper pivotally mounted on the magazine and discharging through its lower end into the open top of the magazine, and means for normally locking the hopper in operative position and permitting the hopper to be swung on its pivotal mounting to one side so as to afford access to the interior of the magazine through its open top.

2. In a potato planter, the combination with an open-top potato magazine having a forward open portion constructed to receive and accommodate a potato-conveying device which is adapted to pass through the forward open portion of the magazine, and a hopper pivotally mounted adjacent to its lower end for delivering potatoes into the rear portion of said open top of the magazine and capable of being swung on its pivotal mounting to one side so as to afford access to the interior of the magazine through the rear portion of its open top.

3. In a potato planter, the combination with a potato magazine constructed to receive and accommodate a potato-conveying device, the magazine having an opening through which potatoes are received and through which access may be had to the conveying device, and a hopper pivotally mounted on the magazine to discharge into said opening and adapted to be swung on its pivotal mounting to one side so as to afford access to the interior of the magazine through said opening therein.

4. In a potato planter, the combination with a potato magazine and a potato-conveying device therein, of an oscillatory gate for regulating the passage of potatoes through the magazine to the potato-conveying means, a rotary eccentric, an adjusting lever moving with the gate, and a connection between the lever and eccentric whereby the gate is oscillated and by adjustment of the lever the gate will increase or diminish the area of said potato passage.

5. In a potato planter, the combination of a potato magazine, a revolving potato picking and dropping device in coöperative relation therewith comprising a series of picker arms, each picker arm having pivotally mounted on its outer end a swinging plate capable of a limited swinging movement and having formed integrally therewith a potato engaging abutment and a stripping portion adjacent thereto and a rear portion adapted to be engaged by a tripper, potato impaling means and a rigid finger fixed on and with respect to the picker arm and arranged in coöperative relation to the potato abutment and stripper portion of the swinging plate, and a stationary tripper for engaging the rear portions of the swinging plates as the same are moved past said tripper to swing the plates and cause their stripper portions to remove the seed potatoes from the impaling means.

6. In a potato planter, a picking and dropping device comprising a revoluble member, two sets of picker arms mounted thereon spaced transversely apart and equally spaced circumferentially in alternating relation, and means allowing picker arms of one set to be circumferentially adjusted relatively to picker arms of the other set.

7. In a potato planter, a main frame consisting of a potato magazine formed in two sections divided centrally longitudinally of the planter and shaped to provide a downwardly and forwardly inclined trough, concaves pivotally and yieldably mounted in the lower portion of said trough, a revolving potato picking and dropping device movable through said trough and coöperating with said concaves, and a hood located in said trough and covering the upper rear portion of the concaves so as to prevent seed potatoes from lodging behind the same.

8. In a potato planter, the combination of a main frame consisting of a potato magazine in the form of two sections divided longitudinally centrally of the planter and providing a downwardly and forwardly inclined trough, bearings detachably mounted on said sections forwardly of said trough, a shaft mounted in said bearings, and a potato picking and dropping device revoluble about said shaft and arranged to gather seed potatoes from the bottom of the trough.

9. In a potato planter, the combination of a potato magazine formed in two side sections joined longitudinally, centrally of the planter and shaped to provide a downwardly and forwardly inclined trough, a shaft mounted on the magazine forwardly of said trough, and a potato picking and dropping device revoluble about said shaft for gathering seed potatoes from the bottom of said trough at the rear of the axle.

10. In a potato planter, the combination of a potato magazine formed in two side sections joined longitudinally centrally of the planter and shaped to provide a downwardly and forwardly inclined open-top trough substantially closed at its forward side, said side sections having integral forward extensions shaped to provide a down spout opening, a shaft mounted on said sections intermediate the down spout opening and said trough, and a potato picking and dropping device revoluble about the shaft and adapted to pick seed potatoes from the bottom of said trough and to carry them directly over said down spout opening.

11. In a potato planter, the combination of a potato magazine consisting of two side sections spaced apart so as to form a central longitudinal opening therebetween and shaped to provide downwardly and forwardly inclined troughs, a dividing wall interposed between the lower forward end of the side sections dividing the opening thereat into two openings, concaves pivotally mounted at the base of said troughs and at the rear of said dividing wall and having central openings in alinement with said two openings, a hood overlying the central opening at the rear of said concaves, and two sets of pickers revolubly mounted so that they pass through said two openings and coöperate with the concaves.

12. In a potato planter, the combination of a frame shaped to provide a potato magazine and having a forwardly and downwardly inclined trough leading to the magazine, a revoluble potato picking and dropping device movable through said trough, concaves disposed in the lower part of the trough and coöperating with the potato picking device, a hood overlying the concaves for preventing potatoes from lodging behind the concaves, and means dividing the trough centrally above the hood for deflecting the potatoes to both sides of the concaves as the potatoes pass downwardly into the trough.

13. In a potato planter, the combination of a frame consisting of two side sections shaped to provide an open-top potato magazine having a forwardly and downwardly inclined trough leading to the magazine and having a central opening through the bottom of the magazine extending longitudinally thereof, an upright dividing wall disposed in the forward portion of said central opening so as to provide a longitudinal opening on each side of the wall, concaves pivotally mounted on the frame and extending through the central opening at the rear of the frame and each having a central opening in longitudinal alinement with the openings at the side of the dividing wall, and two sets of pickers revolubly mounted so that they pass through said alined openings and coöperate with the concaves.

LEWIS E. WATERMAN.